US009638965B2

(12) United States Patent
Zhong et al.

(10) Patent No.: US 9,638,965 B2
(45) Date of Patent: May 2, 2017

(54) DISPLAY PANEL AND THIN FILM TRANSISTOR ARRAY SUBSTRATE

(71) Applicant: SHENZHEN CHINA STAR OPTOELECTRONICS TECHNOLOGY CO. LTD., Guangdong (CN)

(72) Inventors: Xinhui Zhong, Guangdong (CN); Yungjui Lee, Guangdong (CN)

(73) Assignee: SHENZHEN CHINA STAR OPTOELECTRONICS TECHNOLOGY CO. LTD., Guangdong (CN)

( * ) Notice: Subject to any disclaimer, the term of this patent is extended or adjusted under 35 U.S.C. 154(b) by 14 days.

(21) Appl. No.: 14/772,388

(22) PCT Filed: May 20, 2015

(86) PCT No.: PCT/CN2015/079366
§ 371 (c)(1),
(2) Date: Sep. 3, 2015

(87) PCT Pub. No.: WO2016/179850
PCT Pub. Date: Nov. 17, 2016

(65) Prior Publication Data
US 2016/0334677 A1    Nov. 17, 2016

(30) Foreign Application Priority Data

May 12, 2015 (CN) .......................... 2015 1 0239298

(51) Int. Cl.
*G02F 1/1343*    (2006.01)
*G02F 1/1337*    (2006.01)

(52) U.S. Cl.
CPC .. *G02F 1/134309* (2013.01); *G02F 1/133707* (2013.01)

(58) Field of Classification Search
CPC .... G02F 1/1368; G02F 1/1335; G02F 1/1362; G02F 1/136286; G02F 1/134309; G02F 1/134363; G02F 1/136227; G02F 1/133707; G02F 1/134336; G02F 1/133514; G02F 1/136213; G02F 1/1343; G02F 1/133;
(Continued)

(56) References Cited

U.S. PATENT DOCUMENTS 8,199,088 B2 *   6/2012   You ................... G02F 1/133707
                                                            345/87
2010/0157186 A1 *  6/2010  Kim ................... G02F 1/134336
                                                            349/39

* cited by examiner

*Primary Examiner* — Thoi Duong
(74) *Attorney, Agent, or Firm* — Mark M. Friedman

(57) ABSTRACT

A display panel and a thin film transistor (TFT) array substrate are disclosed. A peripheral electrode, a first bar-shaped electrode array, a second bar-shaped electrode array, a third bar-shaped electrode array, and a fourth bar-shaped electrode array are included in a pixel electrode in the display panel. The first bar-shaped electrode array, the second bar-shaped electrode array, the third bar-shaped electrode array, and the fourth bar-shaped electrode array respectively are disposed on a first area, a second area, a third area, and a fourth area which are surrounded by the peripheral electrode. The peripheral electrode connects with the first bar-shaped electrode array, the second bar-shaped electrode array, the third bar-shaped electrode array, and the fourth bar-shaped electrode array. The penetration rate of a pixel unit can be improved by the present invention.

2 Claims, 6 Drawing Sheets

(58) Field of Classification Search
CPC ........ G02F 2001/134345; G02F 2001/134372;
H01L 27/3276; H01L 27/3262; H01L
27/3244; H01L 27/3248; H01L 29/41733
USPC ....... 349/43, 106, 42, 139, 38, 39, 141, 143,
349/144
See application file for complete search history.

DISPLAY PANEL AND THIN FILM TRANSISTOR ARRAY SUBSTRATE

BACKGROUND OF THE INVENTION

1. Field of the invention

The present invention relates to a field of display technology, and more specifically to a display panel and a thin film transistor (TFT) array substrate.

2. Description of the Prior Art

A pixel electrode in a traditional display panel is generally a "*"-shaped structure. The pixel electrode which is the "*"-shaped structure includes a trunk (keel) electrode. The trunk electrode connects with four domains in a pixel unit.

Liquid crystal molecules positioned in the domains are generally inclined in four different directions (i.e., tilted in the four different directions) by the influence of the force of an electric field which is generated by the pixel electrode.

However, liquid crystal molecules which are partially positioned in the trunk electrode are not inclined in the four different directions, but rather are inclined in a direction which is parallel to the two trunks of the trunk electrode (0 degrees and 90 degrees).

Relationships between the structure of the pixel electrode and liquid crystal molecules which are deflected (inclined) are as shown in FIG. 1.

That is, the area which partially corresponds to the trunk electrode appears to be opaque (shadow) in the pixel unit corresponding to the pixel electrode, as shown in FIG. 2.

Therefore, the structure of the traditional pixel electrode reduces the penetration rate of the pixel unit at some level.

Therefore, there is a need to provide a new technical scheme, so as to overcome the above-mentioned disadvantages.

SUMMARY OF THE INVENTION

An object of the present invention is to provide a display panel and a ITT array substrate. The present invention is capable of improving the penetration rate of a pixel unit.

To overcome the above-mentioned disadvantages, the technical schemes of the present invention are hereunder illustrated.

A display panel is provided. The display panel includes a color filter substrate, a liquid crystal layer, and a TFT array substrate. The TFT array substrate includes at least two pixel units. Each of the pixel units includes a pixel electrode. The pixel electrode includes:

a peripheral electrode, wherein an area surrounded by the peripheral electrode is divided into a first area, a second area, a third area, and a fourth area;

a first bar-shaped electrode array located in the first area, wherein the first bar-shaped electrode array includes at least two first bar-shaped electrodes;

a second bar-shaped electrode array located in the second area, wherein the second bar-shaped electrode array includes at least two second bar-shaped electrodes;

a third bar-shaped electrode array located in the third area, wherein the third bar-shaped electrode array includes at least two third bar-shaped electrodes; and a fourth bar-shaped electrode array located in the fourth area, wherein the fourth bar-shaped electrode array includes at least two fourth bar-shaped electrodes. The peripheral electrode connects with the first bar-shaped electrode array, the second bar-shaped electrode array, the third bar-shaped electrode array, and the fourth bar-shaped electrode array. The first bar-shaped electrode array connects with the second bar-shaped electrode array and the third bar-shaped electrode array. The fourth bar-shaped electrode array connects with the second bar-shaped electrode array and the third bar-shaped electrode array. The first portion of the peripheral electrode and a scanning line in the pixel array are partially overlapped or completely overlapped. The second portion of the peripheral electrode and a data line in the pixel array are partially overlapped or completely overlapped. A media layer is further disposed between the peripheral electrode and a signal line. The media layer is positioned at an overlapping portion between the peripheral electrode and the signal line.

In the display panel, the first bar-shaped electrode array is adjacent to the second bar-shaped electrode array in a fifth direction, the first bar-shaped electrode array is adjacent to the third bar-shaped electrode array in a sixth direction, the fourth bar-shaped electrode array is adjacent to the second bar-shaped electrode array in the sixth direction, and the fourth bar-shaped electrode array is adjacent to the third bar-shaped electrode array in the fifth direction. The first bar-shaped electrodes connect with the second bar-shaped electrodes or the third bar-shaped electrodes. The fourth bar-shaped electrodes connect with the second bar-shaped electrodes or the third bar-shaped electrodes.

In the display panel, the extension direction of each of the first bar-shaped electrodes is parallel to a first direction, and there is a first angle between the first direction and the fifth direction; the extension direction of each of the second bar-shaped electrodes is parallel to a second direction, and there is a second angle between the second direction and the fifth direction; the extension direction of each of the third bar-shaped electrodes is parallel to a third direction, and there is a third angle between the third direction and the fifth direction; the extension direction of each of the fourth bar-shaped electrodes is parallel to a fourth direction, and there is a fourth angle between the fourth direction and the fifth direction.

In the display panel, the media layer includes a semiconductor layer and/or a metal layer. The semiconductor layer and the metal layer are formed in a process for forming a thin film transistor switch of the TFT array substrate. A first insulative layer is disposed between the semiconductor layer and the signal line/the peripheral electrode. A second insulative layer is disposed between the semiconductor layer and the metal layer. A third insulative layer is disposed between the metal layer and the peripheral electrode/the signal line.

A display panel is provided. The display panel includes a color filter substrate, a liquid crystal layer, and a TFT array substrate. The TFT array substrate includes at least two pixel units. Each of the pixel units includes a pixel electrode. The pixel electrode includes:

a peripheral electrode, wherein an area surrounded by the peripheral electrode is divided into a first area, a second area, a third area, and a fourth area;

a first bar-shaped electrode array located in the first area, wherein the first bar-shaped electrode array includes at least two first bar-shaped electrodes;

a second bar-shaped electrode array located in the second area, wherein the second bar-shaped electrode array includes at least two second bar-shaped electrodes;

a third bar-shaped electrode array located in the third area, wherein the third bar-shaped electrode array includes at least two third bar-shaped electrodes; and a fourth bar-shaped electrode array located in the fourth area, wherein the fourth bar-shaped electrode array includes at least two fourth bar-shaped electrodes. The peripheral electrode connects with the first bar-shaped electrode array, the second bar-shaped electrode array, the third bar-shaped electrode array, and the fourth bar-shaped electrode array. The first bar-shaped electrode array connects with the second bar-shaped electrode array and the third bar-shaped electrode array. The fourth bar-shaped electrode array connects with the second bar-shaped electrode array and the third bar-shaped electrode array.

In the display panel, the first portion of the peripheral electrode and a scanning line in the pixel array are partially overlapped or completely overlapped.

In the display panel, the second portion of the peripheral electrode and a data line in the pixel array are partially overlapped or completely overlapped.

In the display panel, the first bar-shaped electrode array is adjacent to the second bar-shaped electrode array in a fifth direction, the first bar-shaped electrode array is adjacent to the third bar-shaped electrode array in a sixth direction, the fourth bar-shaped electrode array is adjacent to the second bar-shaped electrode array in the sixth direction, and the fourth bar-shaped electrode array is adjacent to the third bar-shaped electrode array in the fifth direction. The first bar-shaped electrodes connect with the second bar-shaped electrodes or the third bar-shaped electrodes. The fourth bar-shaped electrodes connect with the second bar-shaped electrodes or the third bar-shaped electrodes.

In the display panel, the extension direction of each of the first bar-shaped electrodes is parallel to a first direction, and there is a first angle between the first direction and the fifth direction; the extension direction of each of the second bar-shaped electrodes is parallel to a second direction, and there is a second angle between the second direction and the fifth direction; the extension direction of each of the third bar-shaped electrodes is parallel to a third direction, and there is a third angle between the third direction and the fifth direction; the extension direction of each of the fourth bar-shaped electrodes is parallel to a fourth direction, and there is a fourth angle between the fourth direction and the fifth direction.

In the display panel, a media layer is further disposed between the peripheral electrode and a signal line. The media layer is positioned at an overlapping portion between the peripheral electrode and the signal line.

In the display panel, the media layer includes a semiconductor layer and/or a metal layer. The semiconductor layer and the metal layer are formed in a process for forming a thin film transistor switch of the TFT array substrate.

In the display panel, a first insulative layer is disposed between the semiconductor layer and the signal line/the peripheral electrode, a second insulative layer is disposed between the semiconductor layer and the metal layer, and a third insulative layer is disposed between the metal layer and the peripheral electrode/the signal line.

A TFT array substrate is provided. The TFT array substrate includes at least two pixel units. Each of the pixel units includes a pixel electrode. The pixel electrode includes:

a peripheral electrode, wherein an area surrounded by the peripheral electrode is divided into a first area, a second area, a third area, and a fourth area;

a first bar-shaped electrode array located in the first area, wherein the first bar-shaped electrode array includes at least two first bar-shaped electrodes;

a second bar-shaped electrode array located in the second area, wherein the second bar-shaped electrode array includes at least two second bar-shaped electrodes;

a third bar-shaped electrode array located in the third area, wherein the third bar-shaped electrode array includes at least two third bar-shaped electrodes; and a fourth bar-shaped electrode array located in the fourth area, wherein the fourth bar-shaped electrode array includes at least two fourth bar-shaped electrodes. The peripheral electrode connects with the first bar-shaped electrode array, the second bar-shaped electrode array, the third bar-shaped electrode array, and the fourth bar-shaped electrode array. The first bar-shaped electrode array connects with the second bar-shaped electrode array and the third bar-shaped electrode array. The fourth bar-shaped electrode array connects with the second bar-shaped electrode array and the third bar-shaped electrode array.

In the TFT array substrate, the first portion of the peripheral electrode and a scanning line in the pixel array are partially overlapped or completely overlapped.

In the TFT array substrate, the second portion of the peripheral electrode and a data line in the pixel array are partially overlapped or completely overlapped.

In the TFT array substrate, the first bar-shaped electrode array is adjacent to the second bar-shaped electrode array in a fifth direction, the first bar-shaped electrode array is adjacent to the third bar-shaped electrode array in a sixth direction, the fourth bar-shaped electrode array is adjacent to the second bar-shaped electrode array in the sixth direction, and the fourth bar-shaped electrode array is adjacent to the third bar-shaped electrode array in the fifth direction. The first bar-shaped electrodes connect with the second bar-shaped electrodes or the third bar-shaped electrodes. The fourth bar-shaped electrodes connect with the second bar-shaped electrodes or the third bar-shaped electrodes.

In the TFT array substrate, the extension direction of each of the first bar-shaped electrodes is parallel to a first direction, and there is a first angle between the first direction and the fifth direction; the extension direction of each of the second bar-shaped electrodes is parallel to a second direction, and there is a second angle between the second direction and the fifth direction; the extension direction of each of the third bar-shaped electrodes is parallel to a third direction, and there is a third angle between the third direction and the fifth direction; the extension direction of each of the fourth bar-shaped electrodes is parallel to a fourth direction, and there is a fourth angle between the fourth direction and the fifth direction.

In the TFT array substrate, a media layer is further disposed between the peripheral electrode and a signal line. The media layer is positioned at an overlapping portion between the peripheral electrode and the signal line.

In the TFT array substrate, the media layer includes a semiconductor layer and/or a metal layer. The semiconductor layer and the metal layer are formed in a process for forming a thin film transistor switch of the TFT array substrate.

In the TFT array substrate, a first insulative layer is disposed between the semiconductor layer and the signal line/the peripheral electrode, a second insulative layer is disposed between the semiconductor layer and the metal layer, and a third insulative layer is disposed between the metal layer and the peripheral electrode/the signal line.

In comparison to the prior art, the phenomenon of the improper tilt of liquid crystal molecules, which is caused by a trunk electrode in the pixel electrode, can be effectively avoided in the present invention; thereby the shadows which correspond to the trunk electrode in an image displayed by each of the pixel units can be eliminated, thus is advantageous to improving the penetration rate of each of the pixel units.

The above objectives, and other objectives, features, advantages, and embodiments of the present invention will be better understood from the following description being considered in connection with the accompanied drawings and in which a preferred embodiment of the invention is illustrated by way of example.

DETAILED DESCRIPTION OF THE PREFERRED EMBODIMENTS

The word "embodiment" is used herein to mean serving as an example, instance, or illustration. In addition, the articles "a" and "an" as used in this application and the appended claims should generally be construed to mean "one or more" unless specified otherwise or clear from context to be directed to a singular form.

Figure 1:
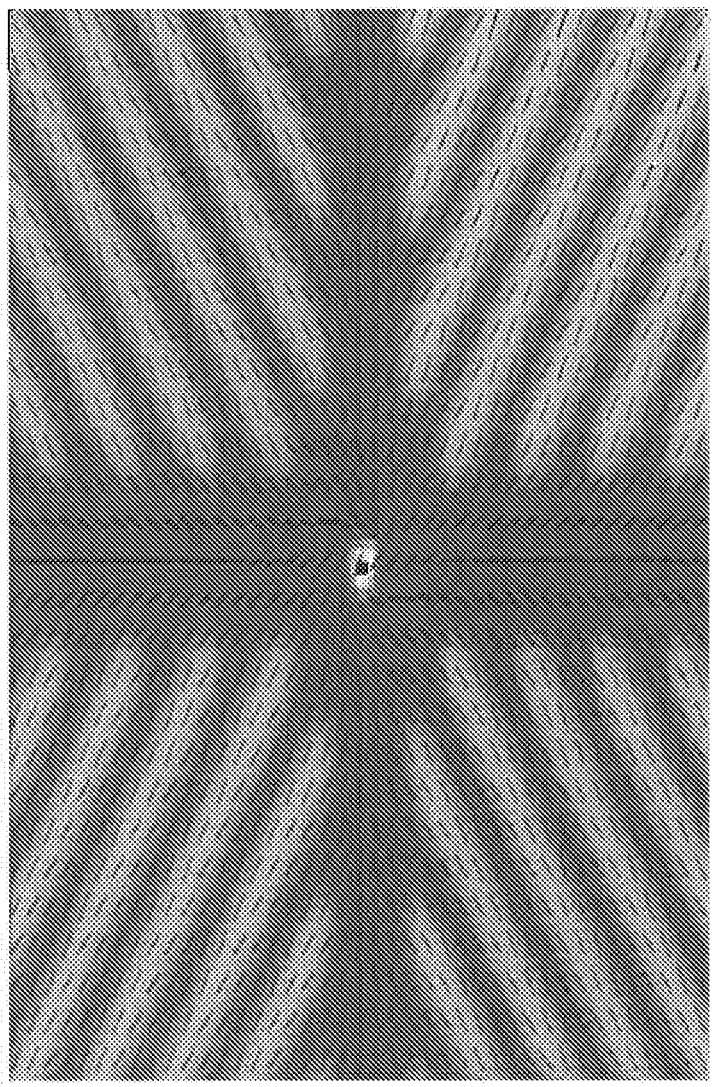
FIG. 1 is a schematic view of relationships between the structure of a traditional pixel electrode and liquid crystal molecules which are deflected.
Figure 2:
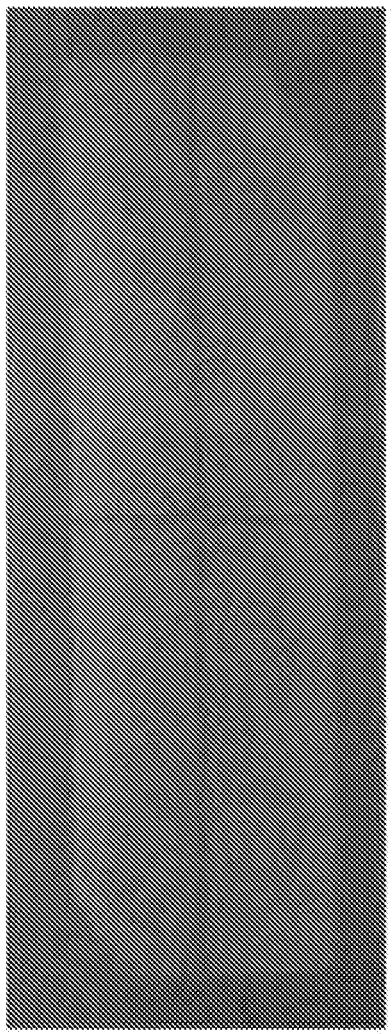
FIG. 2 is a schematic view of the display effect of a pixel unit corresponding to the pixel electrode of FIG. 1.
Figure 3:
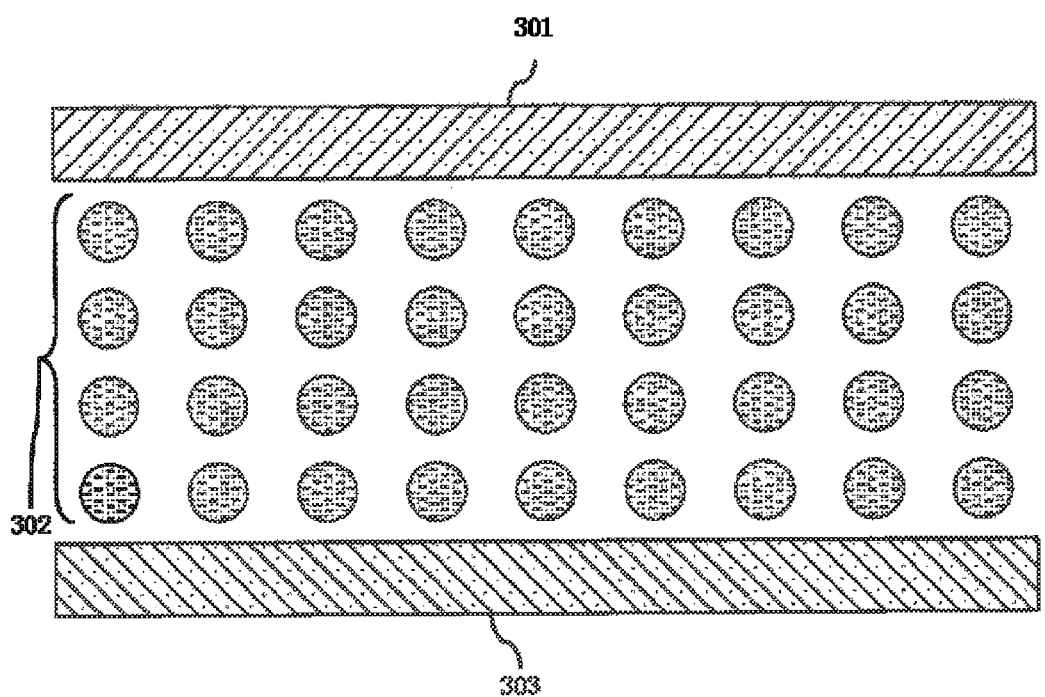
FIG. 3 is a schematic view of a display panel according to the present invention.
Figure 4:
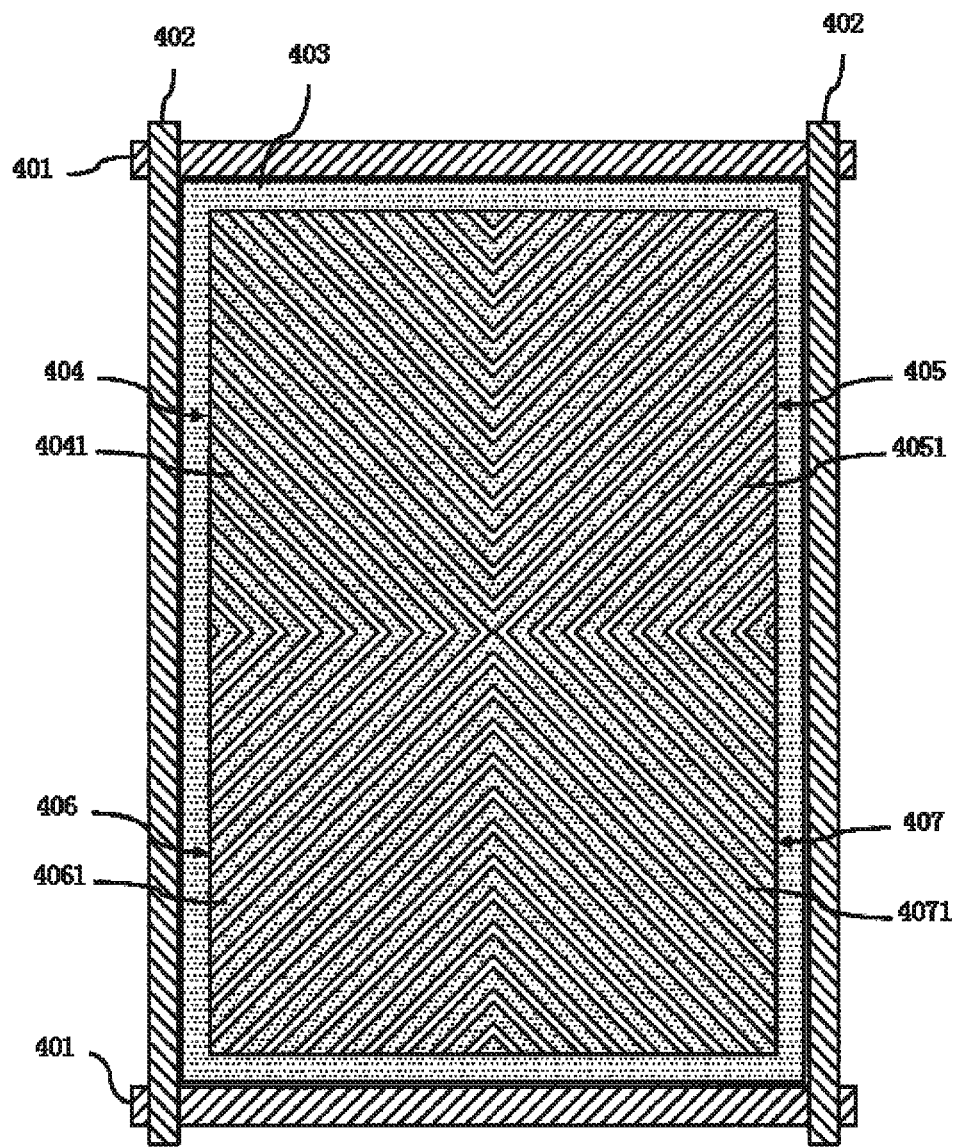
FIG. 4 is a schematic view of a TFT array substrate according to a first embodiment of the present invention.
Figure 5:
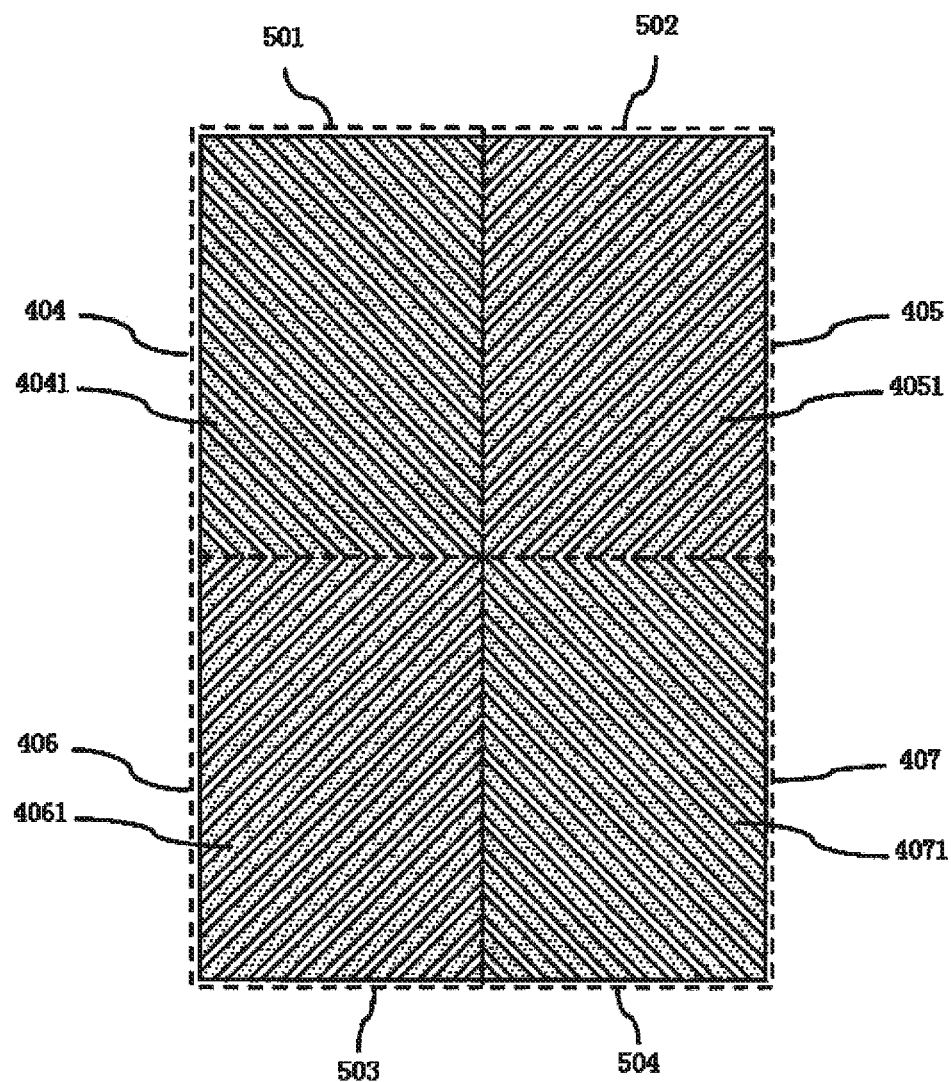
FIG. 5 is a schematic view of a first bar-shaped electrode array, a second bar-shaped electrode array, a third bar-shaped electrode array, and a fourth bar-shaped electrode array of FIG. 4.

Please refer to FIG. 3, FIG. 4, and FIG. 5. FIG. 3 is a schematic view of a display panel according to the present invention. FIG. 4 is a schematic view of a TFT array substrate 303 according to a first embodiment of the present invention. FIG. 5 is a schematic view of a first bar-shaped electrode array 404, a second bar-shaped electrode array 405, a third bar-shaped electrode array 406, and a fourth bar-shaped electrode array 407 of FIG. 4.

The display panel of the present invention can be a thin film transistor liquid crystal display panel (TFT-LCD).

In the present embodiment, the display panel includes a color filter substrate 301, a liquid crystal layer 302, and a TFT array substrate 303. The TFT array substrate 303 and the color filter substrate 301 are stacked and combined. The liquid crystal layer 302 is sandwiched between the TFT array substrate 303 and the color filter substrate 301.

The TFT array substrate 303 includes at least two pixel units. Each of the pixel units includes a pixel electrode. The pixel electrode includes a peripheral electrode 403, a first bar-shaped electrode array 404, a second bar-shaped electrode array 405, a third bar-shaped electrode array 406, and a fourth bar-shaped electrode array 407.

An area surrounded by the peripheral electrode 403 is divided into a first area 501, a second area 502, a third area 503, and a fourth area 504. The first bar-shaped electrode array 404 is located in the first area 501. The first bar-shaped electrode array 404 includes at least two first bar-shaped electrodes 4041. The extension direction of each of the first bar-shaped electrodes 4041 is parallel to a first direction. The first bar-shaped electrodes 4041 are arranged along a direction which is perpendicular to the first direction in the form of an array (a one-dimensional array). The second bar-shaped electrode array 405 is located in the second area 502. The second bar-shaped electrode array 405 includes at least two second bar-shaped electrodes 4051. The extension direction of each of the second bar-shaped electrodes 4051 is parallel to a second direction. The second bar-shaped electrodes 4051 are arranged along a direction which is perpendicular to the second direction in the form of an array (a one-dimensional array). The third bar-shaped electrode array 406 is located in the third area 503. The third bar-shaped electrode array 406 includes at least two third bar-shaped electrodes 4061. The extension direction of each of the third bar-shaped electrodes 4061 is parallel to a third direction. The third bar-shaped electrodes 4061 are arranged along a direction which is perpendicular to the third direction in the form of an array (a one-dimensional array). The fourth bar-shaped electrode array 407 is located in the fourth area 504. The fourth bar-shaped electrode array 407 includes at least two fourth bar-shaped electrodes 4071. The extension direction of each of the fourth bar-shaped electrodes 4071 is parallel to a fourth direction. The fourth bar-shaped electrodes 4071 are arranged along a direction which is perpendicular to the fourth direction in the form of an array (a one-dimensional array).

In the present embodiment, the first bar-shaped electrode array 404 is adjacent to the second bar-shaped electrode array 405 in a fifth direction, and the first bar-shaped electrode array 404 is adjacent to the third bar-shaped electrode array 406 in a sixth direction.

The fourth bar-shaped electrode array 407 is adjacent to the second bar-shaped electrode array 405 in the sixth direction, and the fourth bar-shaped electrode array 407 is adjacent to the third bar-shaped electrode array 406 in the fifth direction.

The peripheral electrode 403 connects with the first bar-shaped electrode array 404, the second bar-shaped electrode array 405, the third bar-shaped electrode array 406, and the fourth bar-shaped electrode array 407. The first bar-shaped electrode array 404 connects with the second bar-shaped electrodes 4051 and the third bar-shaped electrode array 406. The fourth bar-shaped electrode array 407 connects with the second bar-shaped electrodes 4051 and the third bar-shaped electrode array 406.

In the present embodiment, there is a first angle between the first direction and the fifth direction, there is a second angle between the second direction and the fifth direction, there is a third angle between the third direction and the fifth direction, and there is a fourth angle between the fourth direction and the fifth direction. Furthermore, the first direction is in the opposite direction of the fourth direction, and the second direction is in the opposite direction of the third direction.

The first bar-shaped electrodes 4041 connect with the second bar-shaped electrodes 4051 or the third bar-shaped electrodes 4061. The fourth bar-shaped electrodes 4071 connect with the second bar-shaped electrodes 4051 or the third bar-shaped electrodes 4061.

By the above technical scheme, the phenomenon of the improper tilt of liquid crystal molecules which is caused by a trunk electrode in the pixel electrode can be effectively avoided, thereby the shadows which correspond to the trunk electrode in an image displayed by each of the pixel units can be eliminated; this is advantageous to improving the penetration rate of each of the pixel units.

Figure 6:
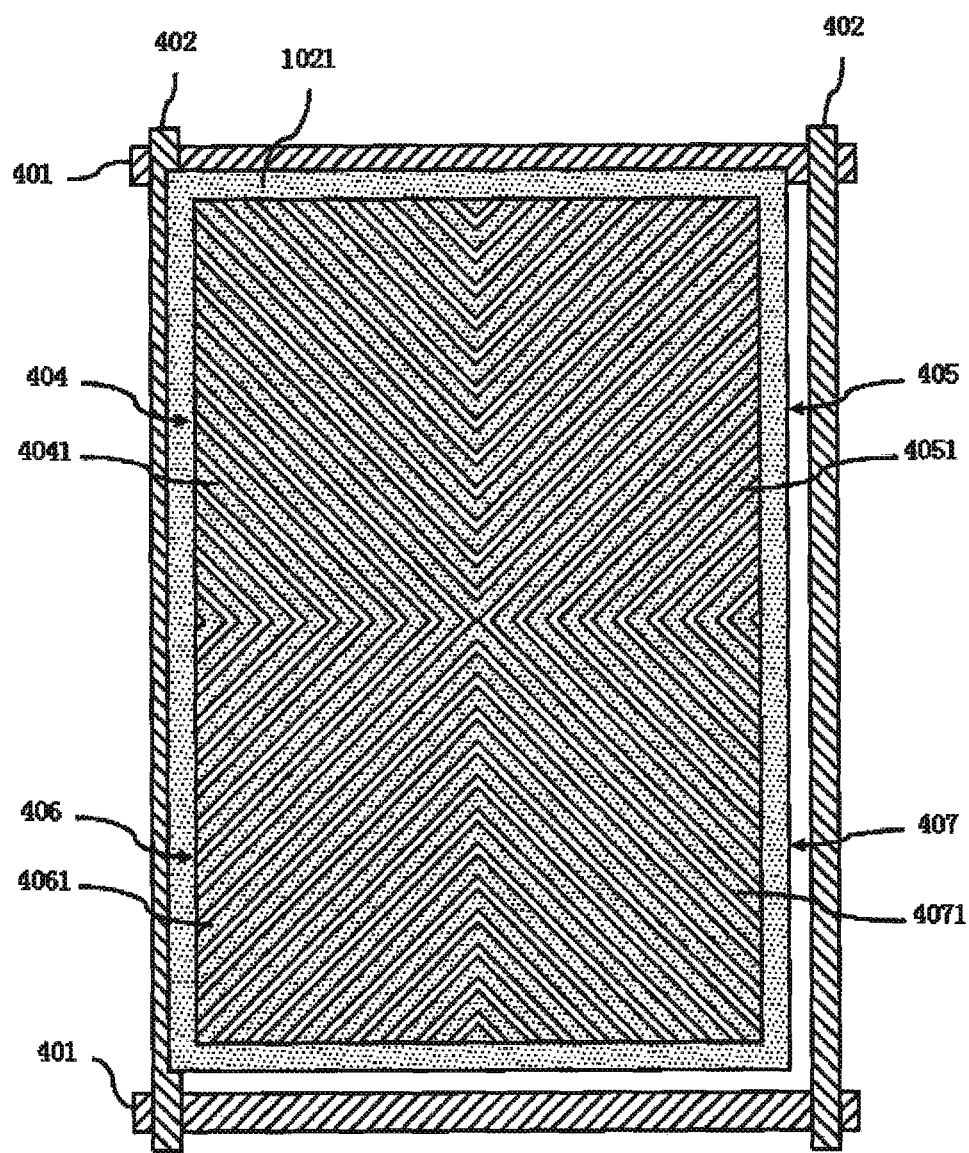
FIG. 6 is a schematic view of a TFT array substrate according to a second embodiment of the present invention.

Please refer to FIG. 6. FIG. 6 is a schematic view of a TFT array substrate 303 according to a second embodiment of the present invention. The present embodiment is similar to the first embodiment. The present embodiment and the first embodiment are different in that:

The first portion of the peripheral electrode 403 and a scanning line 401 in the pixel array are partially overlapped or completely overlapped in a predetermined direction, and/or the second portion of the peripheral electrode 403 and a data line 402 in the pixel array are partially overlapped or completely overlapped in the predetermined direction. The predetermined direction is the normal direction of the TFT array substrate 303.

By the above technical scheme, the force of an electric field applied by the pixel electrode can be applied to liquid crystal molecules in an area positioned on the data line 402 and/or the scanning line 401, thereby deflecting the liquid crystal molecules in the area positioned on the data line 402 and/or the scanning line 401. In this case, the active area of each of the pixel units can be effectively enlarged, thereby significantly improving the aperture ratio of each of the pixel units.

A third embodiment of the thin film transistor array substrate 303 according the present invention is similar to the second embodiment. The third embodiment and the second embodiment are different in that:

In the present embodiment, in a state of at least one portion (i.e., the first portion and/or the second portion) of the peripheral electrode 403 and a signal line (the data line 402 and/or the scanning line 401) having an overlapping portion (i.e., partial overlap or complete overlap), the peripheral electrode 403 and the signal line construct a storage capacitor, and the peripheral electrode 403 and the signal line are two electrode plates of the storage capacitor, respectively.

In the present embodiment, a media layer is further disposed between the peripheral electrode 403 and the signal line in order to reduce the effect of charges stored in the storage capacitor on the gray scale voltages of the pixel electrode. The media layer is positioned at an overlapping portion between the peripheral electrode 403 and the signal line.

The storage capacitor can be reduced by disposing the media layer between the peripheral electrode 403 and the signal line, thereby reducing the effect of the storage capacitor on the force of the electric field of the pixel electrode.

As an improvement, the media layer includes a semiconductor layer and/or a metal layer. The semiconductor layer and the metal layer are formed in a process for forming a thin film transistor switch of the TFT array substrate 303.

A first insulative layer is disposed between the semiconductor layer and the signal line/the peripheral electrode 403. A second insulative layer is disposed between the semiconductor layer and the metal layer. A third insulative layer is disposed between the metal layer and the peripheral electrode 403/the signal line.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. With particular regard to the various functions performed by the above described components, the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such a feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising".

It should be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A display panel, comprising:
a color filter substrate;
a liquid crystal layer; and
a thin film transistor array substrate comprising at least two pixel units, each of the pixel units comprising a pixel electrode, the pixel electrode comprising:
a peripheral electrode, wherein an area surrounded by the peripheral electrode is divided into a first area, a second area, a third area, and a fourth area;
a first bar-shaped electrode array located in the first area, wherein the first bar-shaped electrode array comprises at least two first bar-shaped electrodes;
a second bar-shaped electrode array located in the second area, wherein the second bar-shaped electrode array comprises at least two second bar-shaped electrodes;
a third bar-shaped electrode array located in the third area, wherein the third bar-shaped electrode array comprises at least two third bar-shaped electrodes; and
a fourth bar-shaped electrode array located in the fourth area, wherein the fourth bar-shaped electrode array comprises at least two fourth bar-shaped electrodes,
wherein the peripheral electrode connects with the first bar-shaped electrode array, the second bar-shaped electrode array, the third bar-shaped electrode array, and the fourth bar-shaped electrode array; the first bar-shaped electrode array connects with the second bar-shaped electrode array and the third bar-shaped electrode array; the fourth bar-shaped electrode array connects with the second bar-shaped electrode array and the third bar-shaped electrode array; a first portion of the peripheral electrode and a scanning line in the pixel array are partially overlapped or completely overlapped; a second portion of the peripheral electrode and a data line in the pixel array are partially overlapped or completely overlapped; a media layer is further disposed between the peripheral electrode and a signal line, the media layer is positioned at an overlapping portion between the peripheral electrode and the signal line;
the first bar-shaped electrode array is adjacent to the second bar-shaped electrode array in a fifth direction, and the first bar-shaped electrode array is adjacent to the third bar-shaped electrode array in a sixth direction; the fourth bar-shaped electrode array is adjacent to the second bar-shaped electrode array in the sixth direction, and the fourth bar-shaped electrode array is adjacent to the third bar-shaped electrode array in the fifth direction; the first bar-shaped electrodes connect with the second bar-shaped electrodes or the third bar-shaped electrodes, and the fourth bar-shaped electrodes connect with the second bar-shaped electrodes or the third bar-shaped electrodes;

an extension direction of each of the first bar-shaped electrodes is parallel to a first direction, and there is a first angle between the first direction and the fifth direction; an extension direction of each of the second bar-shaped electrodes is parallel to a second direction, and there is a second angle between the second direction and the fifth direction; an extension direction of each of the third bar-shaped electrodes is parallel to a third direction, and there is a third angle between the third direction and the fifth direction; an extension direction of each of the fourth bar-shaped electrodes is parallel to a fourth direction, and there is a fourth angle between the fourth direction and the fifth direction.

2. The display panel of claim 1, wherein the media layer comprises a semiconductor layer and/or a metal layer, the semiconductor layer and the metal layer are formed in a process for forming a thin film transistor switch of the thin film transistor array substrate; a first insulative layer is disposed between the semiconductor layer and the signal line/the peripheral electrode, a second insulative layer is disposed between the semiconductor layer and the metal layer, and a third insulative layer is disposed between the metal layer and the peripheral electrode/the signal line.

* * * * *